(12) United States Patent
Mapen et al.

(10) Patent No.: US 10,607,096 B2
(45) Date of Patent: Mar. 31, 2020

(54) Z-DIMENSION USER FEEDBACK BIOMETRIC SYSTEM

(71) Applicant: Princeton Identity, Inc., Hamilton, NJ (US)

(72) Inventors: Barry E. Mapen, Stonington, CT (US); John Timothy Green, Lisbon, CT (US); Kevin Richards, Narragansett, RI (US); John Amedeo Santini, Jr., Wakefield, RI (US)

(73) Assignee: Princeton Identity, Inc., Hamilton, NJ (US)

( * ) Notice: Subject to any disclaimer, the term of this patent is extended or adjusted under 35 U.S.C. 154(b) by 46 days.

(21) Appl. No.: 15/944,327

(22) Filed: Apr. 3, 2018

(65) Prior Publication Data
US 2018/0285669 A1   Oct. 4, 2018

Related U.S. Application Data

(60) Provisional application No. 62/481,324, filed on Apr. 4, 2017.

(51) Int. Cl.
*G06K 9/00* (2006.01)

(52) U.S. Cl.
CPC ..... *G06K 9/00912* (2013.01); *G06K 9/00604* (2013.01)

(58) Field of Classification Search
None
See application file for complete search history.

(56) References Cited

U.S. PATENT DOCUMENTS

| 3,852,592 A | 12/1974 | Scoville et al. |
| 3,993,888 A | 11/1976 | Fellman |

(Continued)

FOREIGN PATENT DOCUMENTS

| CN | 102708357 A | 10/2012 |
| CN | 103048848 A | 4/2013 |

(Continued)

OTHER PUBLICATIONS

Iris recognition on the move: Acquisition of images—Environments, James R, Matey et al., IEEE, 0018-9219, 2006, pp. 1936-1947 (Year: 2006).*

(Continued)

*Primary Examiner* — Jayesh A Patel
(74) *Attorney, Agent, or Firm* — McCarter & English, LLP

(57) ABSTRACT

Embodiments of a Z-dimension user-feedback biometric system are provided. In some embodiments, a camera captures subject images positioned along a plurality of Z-dimension positions, including a normal subject image for a mid-range of a capture volume and one or both of the following: (a) a close subject image for a front of the capture volume and (b) a far subject image for a back of the capture volume. In some embodiments, a processing element can be configured to create a normal display image, as well as a close display image (with a first exaggerated quality) and/or a far display image (with a second exaggerated quality). In some embodiments, the first exaggerated quality can be a positive exaggeration of a quality and the second exaggerated quality can be a negative exaggeration of the quality.

20 Claims, 3 Drawing Sheets

(56) References Cited

U.S. PATENT DOCUMENTS

| | | |
|---|---|---|
| 4,109,237 A | 8/1978 | Hill |
| 4,641,349 A | 2/1987 | Flom et al. |
| 5,291,560 A | 3/1994 | Daugman |
| 5,337,104 A | 8/1994 | Smith et al. |
| 5,481,622 A | 1/1996 | Gerhardt et al. |
| 5,572,596 A | 11/1996 | Wildes et al. |
| 5,835,616 A | 11/1998 | Lobo et al. |
| 5,861,940 A | 1/1999 | Robinson et al. |
| 5,930,383 A * | 7/1999 | Netzer ................. G01C 11/02 |
| | | 382/106 |
| 5,933,515 A | 8/1999 | Pu et al. |
| 5,953,440 A | 9/1999 | Zhang et al. |
| 5,966,197 A | 10/1999 | Yee |
| 5,987,459 A | 11/1999 | Swanson et al. |
| 6,055,322 A | 4/2000 | Salganicoff et al. |
| 6,081,607 A | 6/2000 | Mori et al. |
| 6,119,096 A | 9/2000 | Mann et al. |
| 6,144,754 A | 11/2000 | Okano et al. |
| 6,204,858 B1 | 3/2001 | Gupta |
| 6,229,907 B1 | 5/2001 | Okano et al. |
| 6,247,813 B1 | 6/2001 | Kim et al. |
| 6,252,976 B1 | 6/2001 | Schildkraut et al. |
| 6,301,370 B1 | 10/2001 | Steffens et al. |
| 6,307,954 B1 | 10/2001 | Suzaki |
| 6,320,610 B1 | 11/2001 | Van Sant et al. |
| 6,421,462 B1 | 7/2002 | Christian et al. |
| 6,424,727 B1 | 7/2002 | Musgrave et al. |
| 6,433,326 B1 | 8/2002 | Levine et al. |
| 6,438,260 B1 * | 8/2002 | Robinson ................. G06T 15/00 |
| | | 382/131 |
| 6,525,303 B1 | 2/2003 | Gladnick |
| 6,526,160 B1 | 2/2003 | Ito |
| 6,542,624 B1 | 4/2003 | Oda |
| 6,549,644 B1 | 4/2003 | Yamamoto |
| 6,614,919 B1 | 9/2003 | Suzaki et al. |
| 6,681,056 B1 * | 1/2004 | Tseng ..................... G06T 3/40 |
| | | 358/450 |
| 6,714,665 B1 | 3/2004 | Hanna et al. |
| 6,765,581 B2 | 7/2004 | Cheng |
| 6,836,554 B1 | 12/2004 | Bolle et al. |
| 6,850,252 B1 | 2/2005 | Hoffberg |
| 6,895,103 B2 | 5/2005 | Chen et al. |
| 6,912,298 B1 | 6/2005 | Wilensky |
| 6,977,989 B2 | 12/2005 | Bothe et al. |
| 7,015,955 B2 | 3/2006 | Funston et al. |
| 7,095,901 B2 | 8/2006 | Lee et al. |
| 7,099,495 B2 | 8/2006 | Kodno et al. |
| 7,118,042 B2 | 10/2006 | Moore et al. |
| 7,130,453 B2 | 10/2006 | Kondo et al. |
| 7,146,027 B2 | 12/2006 | Kim et al. |
| 7,295,686 B2 | 11/2007 | Wu |
| 7,310,443 B1 | 12/2007 | Kris et al. |
| 7,333,133 B2 * | 2/2008 | Chang .................... G06T 7/80 |
| | | 348/187 |
| 7,380,938 B2 | 6/2008 | Chmielewski, Jr. et al. |
| 7,428,320 B2 | 9/2008 | Northcott et al. |
| 7,466,308 B2 | 12/2008 | Dehlin |
| 7,466,847 B2 | 12/2008 | Komura |
| 7,542,628 B2 * | 6/2009 | Lolacono ............. A61B 5/1171 |
| | | 382/312 |
| 7,574,021 B2 | 8/2009 | Matey |
| 7,583,823 B2 | 9/2009 | Jones et al. |
| 7,599,524 B2 | 10/2009 | Camus et al. |
| 7,627,147 B2 | 12/2009 | Lolacono et al. |
| 7,634,114 B2 | 12/2009 | Zappia |
| 7,657,127 B2 | 2/2010 | Lolacono et al. |
| 7,751,598 B2 | 7/2010 | Matey et al. |
| 7,925,059 B2 | 4/2011 | Hoyos et al. |
| 8,050,463 B2 | 11/2011 | Hamza |
| 8,121,356 B2 * | 2/2012 | Friedman ............ G06K 9/00604 |
| | | 348/143 |
| 8,170,293 B2 | 5/2012 | Tosa et al. |
| 8,189,879 B2 | 5/2012 | Cambier |
| 8,195,576 B1 | 6/2012 | Grigg et al. |
| 8,200,980 B1 | 6/2012 | Robinson et al. |
| 8,212,870 B2 * | 7/2012 | Hanna ..................... H04N 7/18 |
| | | 348/117 |
| 8,317,325 B2 | 11/2012 | Raguin et al. |
| 8,337,104 B2 | 12/2012 | Takiguchi et al. |
| 8,374,404 B2 | 2/2013 | Williams et al. |
| 8,553,948 B2 * | 10/2013 | Hanna ................ G06K 9/00604 |
| | | 382/117 |
| 8,603,165 B2 | 12/2013 | Park |
| 8,639,058 B2 | 1/2014 | Bergen et al. |
| 8,682,073 B2 | 3/2014 | Bergen |
| 8,755,607 B2 | 6/2014 | Bergen et al. |
| 8,854,446 B2 | 10/2014 | Bergen et al. |
| 8,934,005 B2 | 1/2015 | De Bruijn |
| 8,957,856 B2 * | 2/2015 | Stinson, III ........... G06F 3/0304 |
| | | 345/158 |
| 9,002,073 B2 * | 4/2015 | Hanna ..................... A61B 3/14 |
| | | 382/117 |
| 9,036,871 B2 * | 5/2015 | Hanna .................... A61B 5/117 |
| | | 382/117 |
| 9,095,287 B2 * | 8/2015 | Hanna ................ G06K 9/00604 |
| 9,100,825 B2 | 8/2015 | Schultz et al. |
| 9,131,141 B2 | 9/2015 | Tinker et al. |
| 9,138,140 B2 * | 9/2015 | MacKinnon ......... A61B 3/1216 |
| 9,195,890 B2 | 11/2015 | Bergen |
| 9,514,365 B2 | 12/2016 | Tinker et al. |
| 9,665,772 B2 | 5/2017 | Bergen |
| 9,836,647 B2 | 12/2017 | Perna et al. |
| 9,836,648 B2 | 12/2017 | Perna et al. |
| 10,025,982 B2 | 7/2018 | Perna et al. |
| 10,158,939 B2 * | 12/2018 | Mannion ................ H04R 1/406 |
| 2002/0080141 A1 | 6/2002 | Imai et al. |
| 2002/0118864 A1 | 8/2002 | Kondo et al. |
| 2002/0150280 A1 | 10/2002 | Li |
| 2002/0154794 A1 | 10/2002 | Cho |
| 2002/0164054 A1 | 11/2002 | McCartney et al. |
| 2002/0180586 A1 | 12/2002 | Kitson et al. |
| 2003/0046553 A1 | 3/2003 | Angelo |
| 2003/0103652 A1 | 6/2003 | Lee et al. |
| 2003/0123711 A1 | 7/2003 | Kim et al. |
| 2003/0169334 A1 * | 9/2003 | Braithwaite ........ G06K 9/00604 |
| | | 348/78 |
| 2003/0174211 A1 | 9/2003 | Imaoka et al. |
| 2004/0037452 A1 | 2/2004 | Shin |
| 2004/0088584 A1 | 5/2004 | Shachar et al. |
| 2004/0146187 A1 | 7/2004 | Jeng |
| 2004/0170304 A1 | 9/2004 | Haven |
| 2004/0213437 A1 | 10/2004 | Howard et al. |
| 2004/0236549 A1 | 11/2004 | Dalton |
| 2005/0047655 A1 | 3/2005 | Luo et al. |
| 2005/0063582 A1 | 3/2005 | Park et al. |
| 2005/0084179 A1 | 4/2005 | Hanna et al. |
| 2005/0088200 A1 | 4/2005 | Takekuma et al. |
| 2005/0165327 A1 | 7/2005 | Thibault et al. |
| 2005/0210267 A1 | 9/2005 | Sugano et al. |
| 2005/0270386 A1 | 12/2005 | Saitoh et al. |
| 2006/0008125 A1 | 1/2006 | Lauper et al. |
| 2006/0028617 A1 | 2/2006 | Matsumura et al. |
| 2006/0098097 A1 | 5/2006 | Wach et al. |
| 2006/0105806 A1 | 5/2006 | Vance et al. |
| 2006/0120570 A1 | 6/2006 | Azuma et al. |
| 2006/0140454 A1 * | 6/2006 | Northcott ............. A61B 5/1171 |
| | | 382/117 |
| 2006/0150928 A1 | 7/2006 | Lehmann et al. |
| 2006/0184243 A1 | 8/2006 | Yilmaz |
| 2006/0202036 A1 | 9/2006 | Wang et al. |
| 2006/0210123 A1 | 9/2006 | Kondo et al. |
| 2006/0222212 A1 | 10/2006 | Du et al. |
| 2006/0245623 A1 | 11/2006 | Loiacono et al. |
| 2006/0274918 A1 | 12/2006 | Amantea et al. |
| 2007/0014439 A1 | 1/2007 | Ando |
| 2007/0025598 A1 | 2/2007 | Kobayashi et al. |
| 2007/0036397 A1 | 2/2007 | Hamza |
| 2007/0047770 A1 | 3/2007 | Swope et al. |
| 2007/0047772 A1 * | 3/2007 | Matey ................ G06K 9/00617 |
| | | 382/117 |
| 2007/0140531 A1 | 6/2007 | Hamza |
| 2007/0160266 A1 | 7/2007 | Jones et al. |

(56) References Cited

U.S. PATENT DOCUMENTS

| | | |
|---|---|---|
| 2007/0189582 A1 | 8/2007 | Hamza et al. |
| 2007/0198850 A1 | 8/2007 | Martin et al. |
| 2007/0201728 A1 | 8/2007 | Monro |
| 2007/0206935 A1 | 9/2007 | Ono |
| 2007/0236567 A1 | 10/2007 | Pillman et al. |
| 2007/0285537 A1 | 12/2007 | Dwinell et al. |
| 2008/0021331 A1 | 1/2008 | Grinvald et al. |
| 2008/0049185 A1 | 2/2008 | Huffman et al. |
| 2008/0069411 A1 | 3/2008 | Friedman et al. |
| 2008/0121721 A1 | 5/2008 | Chen et al. |
| 2008/0180544 A1 | 7/2008 | Drader et al. |
| 2008/0181467 A1* | 7/2008 | Zappia ............... G06K 9/00604 382/117 |
| 2008/0187174 A1 | 8/2008 | Metaxas et al. |
| 2008/0219515 A1 | 9/2008 | Namgoong |
| 2008/0271116 A1 | 10/2008 | Robinson et al. |
| 2008/0291269 A1* | 11/2008 | Hong ................... H04N 13/156 348/51 |
| 2009/0041309 A1 | 2/2009 | Kim |
| 2009/0060286 A1* | 3/2009 | Wheeler ............ G06K 9/00604 382/117 |
| 2009/0092292 A1 | 4/2009 | Carver et al. |
| 2009/0208064 A1 | 8/2009 | Cambier |
| 2009/0216606 A1 | 8/2009 | Coffman et al. |
| 2009/0220126 A1 | 9/2009 | Claret-Tournier et al. |
| 2009/0232418 A1 | 9/2009 | Lolacono et al. |
| 2009/0274345 A1* | 11/2009 | Hanna ............... G06K 9/00604 382/115 |
| 2009/0278922 A1 | 11/2009 | Tinker et al. |
| 2010/0026853 A1 | 2/2010 | Mokhnatyuk |
| 2010/0034529 A1 | 2/2010 | Jelinek |
| 2010/0046808 A1 | 2/2010 | Connell et al. |
| 2010/0063880 A1 | 3/2010 | Atsmon et al. |
| 2010/0082398 A1 | 4/2010 | Davis et al. |
| 2010/0142938 A1 | 6/2010 | Zhang |
| 2010/0176802 A1 | 7/2010 | Huguet |
| 2010/0202666 A1* | 8/2010 | Ren ................... G06K 9/00604 382/117 |
| 2010/0232655 A1* | 9/2010 | Hanna ............... G06K 9/00604 382/117 |
| 2010/0238316 A1 | 9/2010 | Kim et al. |
| 2010/0278394 A1 | 11/2010 | Raguin et al. |
| 2010/0287053 A1 | 11/2010 | Ganong et al. |
| 2010/0290668 A1 | 11/2010 | Friedman et al. |
| 2010/0301113 A1 | 12/2010 | Bohn et al. |
| 2010/0310133 A1 | 12/2010 | Mason et al. |
| 2010/0328420 A1 | 12/2010 | Roman |
| 2011/0007205 A1 | 1/2011 | Lee |
| 2011/0007949 A1* | 1/2011 | Hanna ............... G06K 9/00604 382/107 |
| 2011/0043683 A1 | 2/2011 | Beach et al. |
| 2011/0075893 A1 | 3/2011 | Connel, II et al. |
| 2011/0081946 A1 | 4/2011 | Singh |
| 2011/0134268 A1 | 6/2011 | MacDonald |
| 2011/0142297 A1 | 6/2011 | Yu et al. |
| 2011/0150101 A1* | 6/2011 | Liu ..................... H04N 13/239 375/240.26 |
| 2011/0187878 A1 | 8/2011 | Mor et al. |
| 2011/0317991 A1 | 12/2011 | Tsai |
| 2012/0086645 A1 | 4/2012 | Zheng et al. |
| 2012/0154536 A1 | 6/2012 | Stoker et al. |
| 2012/0155716 A1 | 6/2012 | Kim |
| 2012/0163783 A1 | 6/2012 | Braithwaite et al. |
| 2012/0242820 A1* | 9/2012 | Hanna ............... G06K 9/00221 348/78 |
| 2012/0243729 A1 | 9/2012 | Pasquero |
| 2012/0293642 A1 | 11/2012 | Berini et al. |
| 2013/0014153 A1 | 1/2013 | Bhatia et al. |
| 2013/0044199 A1 | 2/2013 | Nanu et al. |
| 2013/0051631 A1* | 2/2013 | Hanna ............... G06K 9/00604 382/117 |
| 2013/0081119 A1 | 3/2013 | Sampas |
| 2013/0083185 A1 | 4/2013 | Coleman, III |
| 2013/0089240 A1 | 4/2013 | Northcott et al. |
| 2013/0091520 A1 | 4/2013 | Chen |
| 2013/0147603 A1 | 6/2013 | Malhas et al. |
| 2013/0150120 A1 | 6/2013 | Wu et al. |
| 2013/0162798 A1 | 6/2013 | Hanna et al. |
| 2013/0182093 A1* | 7/2013 | Hanna ............... G06K 9/00604 348/78 |
| 2013/0188943 A1 | 7/2013 | Wu |
| 2013/0194407 A1 | 8/2013 | Kim |
| 2013/0215228 A1 | 8/2013 | Stoker et al. |
| 2013/0250085 A1 | 9/2013 | MacKinnon |
| 2013/0329115 A1 | 12/2013 | Palmeri |
| 2014/0046772 A1 | 2/2014 | Raman |
| 2014/0055337 A1 | 2/2014 | Karlsson |
| 2014/0059607 A1 | 2/2014 | Upadhyay et al. |
| 2014/0071547 A1 | 3/2014 | O'Neill et al. |
| 2014/0078389 A1 | 3/2014 | Merz |
| 2014/0161325 A1 | 6/2014 | Bergen |
| 2014/0171150 A1 | 6/2014 | Hurst et al. |
| 2014/0226876 A1* | 8/2014 | Savvides ............ G06K 9/00604 382/117 |
| 2014/0232930 A1 | 8/2014 | Anderson |
| 2014/0327815 A1 | 11/2014 | Auger |
| 2014/0369575 A1 | 12/2014 | Riopka et al. |
| 2015/0037935 A1 | 2/2015 | Kim et al. |
| 2015/0098629 A1 | 4/2015 | Perna et al. |
| 2015/0098630 A1 | 4/2015 | Perna et al. |
| 2015/0126245 A1 | 5/2015 | Barkan et al. |
| 2015/0193666 A1 | 7/2015 | Derakhshani et al. |
| 2015/0227790 A1 | 8/2015 | Smits |
| 2015/0286864 A1 | 10/2015 | Gottemukkula et al. |
| 2015/0338915 A1 | 11/2015 | Publicover et al. |
| 2015/0379325 A1 | 12/2015 | Tinker et al. |
| 2016/0012275 A1 | 1/2016 | Bergen |
| 2016/0012292 A1 | 1/2016 | Perna et al. |
| 2016/0014121 A1 | 1/2016 | Perna et al. |
| 2016/0117544 A1 | 4/2016 | Hoyos et al. |
| 2016/0148384 A1 | 5/2016 | Bud et al. |
| 2016/0180169 A1 | 6/2016 | Bae et al. |
| 2016/0274660 A1 | 9/2016 | Publicover et al. |
| 2016/0335495 A1* | 11/2016 | Kim ................... G06K 9/00248 |
| 2016/0345818 A1 | 12/2016 | Suzuki et al. |
| 2016/0364609 A1 | 12/2016 | Ivanisov et al. |
| 2017/0111568 A1 | 4/2017 | Hsieh et al. |
| 2017/0124314 A1 | 5/2017 | Laumea |
| 2017/0132399 A1 | 5/2017 | Pawluk et al. |
| 2017/0286790 A1 | 10/2017 | Mapen et al. |
| 2017/0286792 A1 | 10/2017 | Ackerman et al. |
| 2017/0323167 A1 | 11/2017 | Mapen et al. |
| 2017/0337439 A1 | 11/2017 | Ackerman et al. |
| 2017/0337440 A1 | 11/2017 | Green et al. |
| 2017/0337441 A1 | 11/2017 | Mapen et al. |
| 2017/0347000 A1 | 11/2017 | Perna et al. |
| 2018/0025244 A1 | 1/2018 | Bohl et al. |
| 2018/0165537 A1 | 6/2018 | Ackerman |
| 2018/0203112 A1* | 7/2018 | Mannion ............... H04R 1/406 |

FOREIGN PATENT DOCUMENTS

| | | |
|---|---|---|
| CN | 103099624 A | 5/2013 |
| EP | 0821912 A2 | 2/1998 |
| EP | 1324259 A1 | 7/2003 |
| JP | 2007011667 A | 1/2007 |
| JP | 2008-538425 A | 10/2008 |
| JP | 4372321 B2 | 11/2009 |
| KR | 2003-0066512 A | 8/2003 |
| KR | 10-2011-0134848 A | 12/2011 |
| WO | WO-1996/19132 A1 | 6/1996 |
| WO | WO-1997/14873 A1 | 4/1997 |
| WO | WO-1997/21188 A1 | 6/1997 |
| WO | WO-1998/08439 A1 | 3/1998 |
| WO | WO-1999/31183 A1 | 6/1999 |
| WO | WO-2000/39760 A1 | 7/2000 |
| WO | WO-2013/056001 A1 | 4/2013 |
| WO | 2014/100250 A2 | 6/2014 |
| WO | WO-2014/093227 A1 | 6/2014 |
| WO | WO-2015/102704 A2 | 7/2015 |
| WO | WO-2017/172695 A1 | 10/2017 |
| WO | WO-2017/173228 A1 | 10/2017 |

(56) References Cited

FOREIGN PATENT DOCUMENTS

OTHER PUBLICATIONS

Joint Depth and color—with distortion Correction, Daniel Herrera C. et al., IEEE, 0162-8828, 2012, pp. 2058-2064 (Year: 2012).*
International Search Report of the International Searching Authority dated Jun. 28, 2018, issued in connection with International Application No. PCT/US2018/025895 (3 pages).
Written Opinion of the International Searching Authority dated Jun. 28, 2018, issued in connection with International Application No. PCT/US2018/025895 (10 pages).
Annapoorani et al., Accurate and Fast Iris Segmentation. International Journal of Engineering Science and Technology. 2010;2(6):1492-1499.
Arfken, G., "Mathematical Methods for Physicists," Academic Press, NY 6.sup.th Ed. (2005).
Atos Origin, "UK Passport Service, Biometrics Enrollment Trial." Atos Origin Report (May 2005).
Bertalmio et al., Navier-Stokes, Fluid Dynamics, and Image and Video Inpainting. Proceedings of the 2001 IEEE Computer Society Conferenc on Computer Vision and Pattern Recognition. CVPR 2001, 8 pages, (2001).
Betke, et al., "Preliminary Investigation of Real-time Monitoring of a Driver in City Traffic," IEEE Intelligent Vehicles Syposium, Oct. 3-5, 2000, Dearborn, MI, 563-568.
Boehnen et al., A Multi-Sample Standoff Multimodal Biometric System, Theory, Aoolications and Systems (BTAS), Sep. 23, 2012, pp. 127-134.
Bowyer et al., Image Understanding for Iris Biometrics: A Survey. Computer Vision and Image Understanding. 2008;110:281-307.
Braithwaite, Michael et al., "Application-Specific Biometric Templates," AutoID 2002 Workshop, Tarrytown, NY, pp. 1-10 (2002).
Burt, et al., "The Laplacian Pyramid as a Compact Image Code," IEEE Transactions on Communications, 31(4): 532-540, 1983.
Canadian Offic Action for Application 2,833, 740 dated Jan. 15, 2018.
Office Action dated Nov. 19, 2018, issued in connection with U.S. Appl. No. 15/661,297 (22 pages).
Office Action dated Oct. 30, 2018, issued in connection with U.S. Appl. No. 15/514,098 (35 pages).
Office Action dated Sep. 26, 2018, issued in connection with U.S. Appl. No. 15/471,131 (15 pages).
Daugman John, "How Iris Recognition Works," IEEE Transactions on Circuits and Systems for Video Teohnology, vol. 14, No. 1 (Jan. 2004).
Daugman, J., "High confidence visual recognition of persons by a test of statistical independence", IEEE Transactions on Pattern Analysis and Machine Intelligence, 15 (11), pp. 1148-1161 (1993).
Daugman, J., "Recognizing Persons by Their Iris Patterns," in Biometrics: Personal Indentification in a Networked Society, A.K. Jain, et al., eds. Kluwer Academic Pub. 1999.
Daugman, John et al., "Iris recognition border-crossing system in the UAE," International Airport Review, Issue 2 (2004).
Daugman, John."How Iris Recognition Works".Jun. 13, 2003. IEEE Transactions on Circuits and Systems for Video technology, vol. 14, No. 1.
Daugman, The Importance of Being Random: Statistical Principles of Iris Recognition. Pattern Recognition. Pre-publication version. 13 pages, Dec. 21, 2001.
DellaVecchia, et al., "Methodology and apparatus for using the human iris as a robust biometric," Ophthalmic Technologies VIII, SPIE Biomedical Optics Society, Photonics West Conference, San Jose, CA Jan. 24, 1998.
Du et al., Analysis of Partial Iris Recognition Using a 1-D Approach. Proceedings, IEEE International Conference on Acoustics, Speech, and Signal Processing. Mar. 18-23, 2005;2:961-964.
European Office Action for Application 12719332.4 dated Jan. 29, 2018.
European Search Report for Apllication 14876521.7 dated Oct. 19, 2017.
Extended European Search Report in connection with European Patent Application No. 15864635.6 dated Jun. 6, 2018 (8 pages).
Fan, et al., "An Efficient Automatic Iris Image Acquisition and Preprocessing System," Proceedings of the 2006 IEEE International Conference on Mechatronics and Automation, pp. 1779-1784 (6 pages).
Final Office Action dated Aug. 18, 2016 from U.S. Appl. No. 14/858,715, filed Sep. 18, 2015 (6 pages).
Final Office Action dated Aug. 4, 2016 from U.S. Appl. No. 14/509,366, filed Oct. 8, 2014 (24 pages).
Final Office Action dated Mar. 21, 2017 from U.S. Appl. No. 14/863,936, filed Sep. 24, 2015 (17 pages).
Final Office Action dated Mar. 22, 2017 from U.S. Appl. No. 14/863,950, filed Sep. 24, 2015 (16 pages).
Final Office Action dated Mar. 22, 2017 from U.S. Appl. No. 14/863,960, filed Sep. 24, 2015 (21 pages).
Final Office Action for U.S. Appl. No. 10/818,307, dated Jan. 21, 2009, 28 pages.
Final Office Action for U.S. Appl. No. 10/818,307, dated Jan. 30, 2008, 19 pages.
Final Office Action for U.S. Appl. No. 11/377,042, dated Nov. 14, 2008, 20 pages.
Final Office Action for U.S. Appl. No. 11/510,197, dated May 5, 2009, 16 pages.
Final Office Action for U.S. Appl. No. 12/464,369, dated Aug. 5, 2014, 22 pages.
Final Office Action for U.S. Appl. No. 12/464,369, dated Oct. 3, 2012, 27 pages.
Final Office Action for U.S. Appl. No. 12/576,644, dated Oct. 13, 2010, 11 pages.
Final Office Action for U.S. Appl. No. 14/100,615, dated Sep. 1, 2015, 22 pages.
Final Office Action for U.S. Appl. No. 14/509,356, dated Sep. 28, 2016, 20 pages.
Final Office Action for U.S. Appl. No. 14/509,366, dated Aug. 4, 2016, 29 pages.
Final Office Action for U.S. Appl. No. 14/846,090, dated Jun. 15, 2016, 17 pages.
Final Office Action for U.S. Appl. No. 14/858,715, dated Aug. 18, 2016, 29 pages.
Final Office Action for U.S. Appl. No. 14/858,715, dated Aug. 18, 2016, 6 pages.
Final Office Action for U.S. Appl. No. 14/863,936, dated Mar. 21, 2017, 17 pages.
Final Office Action for U.S. Appl. No. 14/863,950, dated Mar. 22, 2017, 16 pages.
Final Office Action for U.S. Appl. No. 14/863,960, dated Mar. 22, 2017, 21 pages.
First Japanese Office Action for Application 2015-545911 dated Feb. 26, 2018 ( with English translation).
FIT Validation Studies, http://www.pmifit.com/validation.htm, Mar. 2, 2004.
Google Scholar Search—"Rida Hadma" pp. 1 of 2.
Haro, et al., "Detecting and Tracking Eyes by Using Their Physiological Properties, Dynamics and Appearance," CVPR 2000, 163-168.
Hutchinson, et al., "Human-Computer Interaction Using Eye-Gaze Input," IEEE Transaction on Systems, Man and Cybernetics, 19(6): 1527-1534, 1989.
International Biometrics Group, "Independent Testing of Iris Recognition Technology, Final Report," Study Commissioned by the US Department of Homeland Security (May 2005).
International Preliminary Report on Patentability for Application No. PCT/US2015/051863, dated Mar. 28, 2017, 6 pages.
International Search Report and Written Opinion for Application No. PCT/US17/13110, dated May 18, 2017, 12 pages.
International Search Report and Written Opinion for Application No. PCT/US17/24444, dated Jun. 19, 2017, 9 pages.
International Search Report and Written Opinion for Application No. PCT/US2013/073887, dated Mar. 20, 2014, 11 pages.
International Search Report and Written Opinion for Application No. PCT/US2017/025303, dated Jun. 16, 2017, 11 pages.
International Search Report and Written Opinion for PCT/US2017/24444 dated Jun. 19, 2017 pp. 1-15.

(56) References Cited

OTHER PUBLICATIONS

International Search Report and Written Opinion for PCT/US2018/042807, dated Sep. 27, 2018, pp. 1-19.
International Search Report and Written Opinionf for PCT/US2017/025303 dated Jun. 16, 2017.
International Search Report for Application No. PCT/US2015/051863, dated Dec. 10, 2015, 1 page.
International Search Report for Application No. PCT/US2017/065793, dated Feb. 16, 2018, 3 pages.
International Search Report for PCT/US2015061024, dated Mar. 31, 2016.
Iwai, Daisuke, Shoichiro Mihara, and Kosuke Sato. "Extended depth-of-field projector by fast focal sweep projection." IEEE transactions on visualization and computer graphics 21.4 (2015): 462-470.
Jacob, R., "The Use of Eye Movements in Human-Computer Interaction Techniques: What you Look at is What you Get," ACM Trans. Info.Sys., 9(3):152-169.
Japanese Office Action for Application No. 2015-545911, dated Feb. 20, 2018, 6 pages.
Li, Zexi, "An Iris Recognition Algorithm Based on Coarse and Fine Location," 2017 IEEE 2nd International Conference on Big Data Analysis, pp. 744-747 (4 pages).
Ma et al., "Efficient Iris Recognition by Characterizing Key Local Variations", IEEE Transactions on Image Processing, vol. 13, No. 6, Jun. 2004, 12 pages.
Ma., et al. "Iris Recognition Using Circular Symmetric Filters," Pattern Recognition, 2002, Proceedings 16th International Conference on vol. 2 IEEE, 2002 (4 pages).
Ma., et al., "Iris Recognition Based on Multichannel Gabor Filtering" ACCV2002: The 5th Asian Conference on Computer Vision, Jan. 23-25, 2002, Melbourne, Australia (5 pages).
Mansfield, Tony et al., "Biometric Product Testing Final Report," CESG Contract X92A/4009309, CESG/BWG Biometric Test Programme; Centre for Mathematics & Scientific Computing, National Physical Laboratory (2001).
Matey et al., Iris on the Move: Acquisition of Images for Iris Recognition in Less Constrained Environments. Proceedings of the IEEE. Nov. 2006;94(11):1936-1947.
Miyazawa et al., Iris Recognition Algorithm Based on Phase-Only Correlation, The Institute of Image Information and Television Engineers, JapanJun. 27, 2006, vol. 30, No. 33, pp. 45-48.
Monro et al., An Effective Human Iris Code with Low Complexity. IEEE International Conference on Image Processing. Sep. 14, 2005;3:277-280.
Narayanswamy, et al., "Extended Depth-of-Field Iris Recognition System for a Workstation Environment," Proc. SPIE. vol. 5779 (2005) (10 pages).
Negin, et al., "An Iris Biometric System for Public and Personal Use," IEEE Computer, pp. 70-75, Feb. 2000.
Nguyen, et al., "Quality-Driven Super-Resolution for Less Constrained Iris Recognition at a Distance and on the Move," IEEE Transactions on Information Forensics and Security 6.4 (2011) pp. 1248-1558 (11 pages).
Non-Final Office Action for U.S. Appl. No. 10/809,471, dated Mar. 19, 2007, 12 pages.
Non-Final Office Action for U.S. Appl. No. 10/818,307, dated Jul. 10, 2008, 28 pages.
Non-Final Office Action for U.S. Appl. No. 10/818,307, dated Mar. 20, 2007, 22 pages.
Non-Final Office Action for U.S. Appl. No. 11/334,968, dated Jan. 6, 2009, 28 pages.
Non-Final Office Action for U.S. Appl. No. 11/377,042, dated Apr. 8, 2009, 22 pages.
Non-Final Office Action for U.S. Appl. No. 11/377,042, dated Jan. 7, 2008, 13 pages.
Non-Final Office Action for U.S. Appl. No. 11/510,197, dated Oct. 10, 2008, 36 pages.
Non-Final Office Action for U.S. Appl. No. 11/510,197, dated Oct. 8, 2009, 21 pages.
Non-Final Office Action for U.S. Appl. No. 11/849,969, dated Dec. 19, 2008, 17 pages.
Non-Final Office Action for U.S. Appl. No. 11/857,432, dated Dec. 30, 2008, 23 pages.
Non-Final Office Action for U.S. Appl. No. 12/429,695, dated Sep. 2, 2009, 11 pages.
Non-Final Office Action for U.S. Appl. No. 12/464,369, dated Jan. 2, 2015, 23 pages.
Non-Final Office Action for U.S. Appl. No. 12/464,369, dated May 9, 2012, 33 pages.
Non-Final Office Action for U.S. Appl. No. 12/576,644, dated Jul. 14, 2010, 14 pages.
Non-Final Office Action for U.S. Appl. No. 13/096,716, dated May 23, 2013, 16 pages.
Non-Final Office Action for U.S. Appl. No. 13/096,724, dated Jan. 16, 2014, 29 pages.
Non-Final Office Action for U.S. Appl. No. 13/096,728, dated May 7, 2013, 33 pages.
Non-Final Office Action for U.S. Appl. No. 13/096,728, dated Nov. 8, 2012, 37 pages.
Non-Final Office Action for U.S. Appl. No. 14/100,615, dated Mar. 4, 2015, 19 pages.
Non-Final Office Action for U.S. Appl. No. 14/509,356, dated Feb. 29, 2016, 19 pages.
Non-Final Office Action for U.S. Appl. No. 14/509,356, dated Mar. 16, 2017, 21 pages.
Non-Final Office Action for U.S. Appl. No. 14/509,366, dated Feb. 21, 2017, 25 pages.
Non-Final Office Action for U.S. Appl. No. 14/509,366, dated Mar. 3, 2016, 40 pages.
Non-Final Office Action for U.S. Appl. No. 14/846,090, dated Jan. 7, 2016, 35 pages.
Non-Final Office Action for U.S. Appl. No. 14/858,715, dated Mar. 14, 2016, 37 pages.
Non-Final Office Action for U.S. Appl. No. 14/863,936, dated Aug. 4, 2016, 16 pages.
Non-Final Office Action for U.S. Appl. No. 14/863,936, dated Sep. 26, 2017, 28 pages.
Non-Final Office Action for U.S. Appl. No. 14/863,950, dated Aug. 3, 2016, 15 pages.
Non-Final Office Action for U.S. Appl. No. 14/863,950, dated Sep. 26, 2017, 22 pages.
Non-Final Office Action for U.S. Appl. No. 14/863,960, dated Aug. 3, 2016, 21 pages.
Non-Final Office Action for U.S. Appl. No. 14/863,960, dated Sep. 28, 2017, 28 pages.
Non-Final Office Action for U.S. Appl. No. 15/475,425, dated Jul. 12, 2018, 31 pages.
Non-Final Office Action for U.S. Appl. No. 15/531,922, dated Jun. 12, 2018, 17 pages.
Non-Final Office Action for for U.S. Appl. No. 12/464,369, dated Feb. 27, 2014, 25 pages.
Notice of Allowance dated Feb. 1, 2017 from U.S. Appl. No. 14/858,715, filed Sep. 18, 2015 (8 pages).
Notice of Allowance for U.S. Appl. No. 10/809,471, dated Mar. 24, 2008, 14 pages.
Notice of Allowance for U.S. Appl. No. 10/809,471, dated Oct. 5, 2007, 11 pages.
Notice of Allowance for U.S. Appl. No. 10/818,307, dated May 18, 2009, 8 pages.
Notice of Allowance for U.S. Appl. No. 11/334,968, dated Apr. 17, 2009, 11 pages.
Notice of Allowance for U.S. Appl. No. 11/377,042, dated Sep. 8, 2009, 16 pages.
Notice of Allowance for U.S. Appl. No. 11/510,197, dated Feb. 1, 2010, 13 pages.
Notice of Allowance for U.S. Appl. No. 11/849,969, dated Aug. 20, 2009, 21 pages.
Notice of Allowance for U.S. Appl. No. 11/849,969, dated Jul. 10, 2009, 18 pages.
Notice of Allowance for U.S. Appl. No. 11/857,432, dated Jun. 17, 2009, 17 pages.

(56) References Cited

OTHER PUBLICATIONS

Notice of Allowance for U.S. Appl. No. 12/429,695, dated Dec. 15, 2009, 7 pages.
Notice of Allowance for U.S. Appl. No. 12/429,695, dated Nov. 17, 2009, 12 pages.
Notice of Allowance for U.S. Appl. No. 12/464,369, dated May 8, 2015, 29 pages.
Notice of Allowance for U.S. Appl. No. 12/576,644, dated Dec. 10, 2010, 14 pages.
Notice of Allowance for U.S. Appl. No. 13/096,716, dated Oct. 30, 2013, 25 pages.
Notice of Allowance for U.S. Appl. No. 13/096,724, dated Aug. 19, 2014, 17 pages.
Notice of Allowance for U.S. Appl. No. 13/096,728, dated Feb. 7, 2014, 33 pages.
Notice of Allowance for U.S. Appl. No. 13/096,735, dated Jun. 24, 2013, 24 pages.
Notice of Allowance for U.S. Appl. No. 13/096,735, dated Oct. 4, 2013, 26 pages.
Notice of Allowance for U.S. Appl. No. 14/100,615, dated Sep. 28, 2015, 22 pages.
Notice of Allowance for U.S. Appl. No. 14/509,356, dated Aug. 1, 2017, 29 pages.
Notice of Allowance for U.S. Appl. No. 14/509,366, dated Jul. 31, 2017, 59 pages.
Notice of Allowance for U.S. Appl. No. 14/846,090, dated Jul. 25, 2016, 22 pages.
Notice of Allowance for U.S. Appl. No. 14/858,715, dated Feb. 1, 2017, 42 pages.
Notice of Allowance for U.S. Appl. No. 14/858,715, dated Feb. 1, 2017, 8 pages.
Notice of Allowance for U.S. Appl. No. 14/858,715, dated Mar. 1, 2017, 13 pages.
Notice of Allowance for U.S. Appl. No. 14/863,936, dated Mar. 20, 2018, 9 pages.
Notice of Allowance for U.S. Appl. No. 14/863,950, dated Mar. 27, 2018, 9 pages.
Notice of Allowance for U.S. Appl. No. 14/863,960, dated Mar. 20, 2018, 9 pages.
Office Action dated Aug. 3, 2016 from U.S. Appl. No. 14/863,950, filed Sep. 24, 2015 (15 pages).
Office Action dated Aug. 3, 2016 from U.S. Appl. No. 14/863,960, filed Sep. 24, 2015 (21 pages).
Office Action dated Aug. 4, 2016 from U.S. Appl. No. 14/863,936, filed Sep. 24, 2015 (16 pages).
Office Action dated Feb. 21, 2017 from U.S. Appl. No. 14/509,366, filed Oct. 8, 2014 (25 pages).
Office Action dated Mar. 14, 2016 from U.S. Appl. No. 14/858,715, filed Sep. 18, 2015 (9 pages).
Office Action dated Mar. 3, 2016 from U.S. Appl. No. 14/509,366, filed Oct. 8, 2014 (19 pages).
Ortiz et al., An Optimal Strategy for Dilation Based Iris Image Enrollment. IEEE International Joint Conference on Biometrics. 6 pages, Sep. 29-Oct. 2, 2014.
Restriction Requirement for U.S. Appl. No. 11/510,197, dated May 16, 2008, 12 pages.
Robert J.K. Jakob, "Eye Movement Based Human Computer Interaction Techniques; Toward Non-Command Interfaces," Advances in Human-Computer Interaction, vol. 4, ed. by H.R. Hartson and D. Hix, pp. 151-190, Ablex Publishing Co., Norwood, N.J. (1993).
Robert J.K. Jakob, "Eye Tracking in Advanced Interface Design," in Virtual Environments and Advanced Interface Dseign, ed. by W. Barfield and T.A. Furness, pp. 258-288, Oxford University Press, New York (1995).
Roth, Mouthpiece Meditations, Part 3. Online Trombone Journal, www.trombone.org. 5 pages, Jul. 23, 2018.
Schovanec, Ocular Dynamics and Skeletal Systems, IEEE Control Systems Magazine. Aug. 2001;21(4):70-79.
Scoblete, The Future of the Electronic Shutter. pdn, Photo District News, retrieved online at: https://www.pdnonline.com/gear/cameras/the-future-of-the-electronic-shutter/, 6 pates, May 9, 2016.
Second Japanese Office Action for Application 2015-545911 dated Feb. 26, 2018 ( with English translation).
Singapore Search Report and Written Report for Application No. 11201704097X, dated Mar. 13, 2018, 5 pages.
SRI International, "Seeing the Future of Iris Recognition", available at www.sri.com/iom, Mar. 2014, 9 pages.
Swiniarski, Experiments on Human Recognition Using Error Backpropagation Artificial Neural Network. Neural Networks Class (CS553) of San Diego State University Computer Science Department, Apr. 2004.
Tan et al., Efficient Iris Recognition by Characterizing Key Local Variations. IEEE Transactions on Image Processing. Jun. 2004;13(6):739-750.
U.S. Appl. No. 14/100,615, "Iris Biometric Matching System", filed Dec. 9, 2013, 57 pages.
U.S. Appl. No. 14/100,615, "Iris Biometric Matching System," filed Dec. 9, 2013, 61 pages.
U.S. Appl. No. 61/888,130, filed Oct. 8, 2013, 20 pages.
van der Wal, et al., "The Acadia Vision Processor," IEEE International Workshop on Computer Architecture for Machine Perception, pp. 31-40, Padova, Italy, Sep. 11-13, 2000.
Weisstein E. et al.; "Circle" From MathWorld—A Wolfram Web Resource. www.mathworld.wolfram.com/circle.html, pp. 1 to 8., Jul. 3, 2008.
Wildes, R., "Iris Recognition: An Emerging Biometric Technology," Proc. IEEE, 85(9):1348-1363, Sep. 1997.
Written Opinion for Application No. PCT/US2015/051863, dated Dec. 10, 2015, 5 pages.
Written Opinion for Application No. PCT/US2017/065793, dated Feb. 16, 2018, 10 pages.
Written Opinion for PCT/US2015061024, dated Mar. 21, 2016.
www.m-w.com--definition- "ellipse" (Refer to Ellipse Illustration; also attached) pp. 1 of 2.
Yokoya, Ryunosuke, and Shree K. Nayar. "Extended depth of field catadioptric imaging using focal sweep." Proceedings of the IEEE International Conference on Computer Vision. 2015.
Zhu, et al., "Biometric Personal Identification Based on Iris Patterns," Pattern Recognition, Proceedings 15th International Conference on vol. 2 IEEE (2000) (4 pages).
U.S. Appl. No. 15/471,131, filed Mar. 28, 2017, Published.
U.S. Appl. No. 15/475,425, filed Mar. 31, 2017, Published.
U.S. Appl. No. 15/514,098, filed Mar. 24, 2017, Published.
U.S. Appl. No. 15/531,922, filed May 31, 2017, Published.
U.S. Appl. No. 15/661,188, filed Jul. 27, 2017, Published.
U.S. Appl. No. 15/661,246, filed Jul. 27, 2017, Published.
U.S. Appl. No. 15/661,267, filed Jul. 27, 2017, Published.
U.S. Appl. No. 15/661,297, filed Jul. 27, 2017, Published.
U.S. Appl. No. 15/661,340, filed Jul. 27, 2017, Published.
U.S. Appl. No. 16/039,442, filed Jul. 19, 2018, Pending.
U.S. Appl. No. 15/839,020, filed Dec. 12, 2017, Published.

\* cited by examiner

Z-DIMENSION USER FEEDBACK BIOMETRIC SYSTEM

CROSS-REFERENCE TO RELATED APPLICATIONS

The present application claims the benefit of priority to U.S. provisional patent application No. 62/481,324, filed Apr. 4, 2017, the entire contents of which are incorporated herein by reference for all purposes.

FIELD OF THE PRESENT DISCLOSURE

The present disclosure relates to systems and methods of biometric capture devices and, in particular, to biometric capture devices that require the user to align themselves with the multidimensional capture volume.

BACKGROUND OF THE PRESENT DISCLOSURE

Biometric systems enroll, verify, and identify subjects by acquiring and comparing biometric samples from a subject. A biometric capture device is responsible for the acquisition portion of the system. The boundary of space within which a sample may be acquired by the device is defined as the capture volume. A capture volume may vary in number of dimensions, shape, size, and other attributes. When the biometric capture device uses a camera to acquire samples the capture volume is generally defined as a frustum shape in three dimensions. Facing the sensor the subject can move left or right (X-dimension), squat down or stand up (Y-dimension), and move towards or away from the sensor (Z-dimension). Moving outside the X or Y limits of the sensor's field of view prevents the sensor from imaging the subject. The limits in the Z dimension are more complicated. As the subject approaches or retreats from the sensor several physical limits start to impact the acquisition system. For example, the system may be nominally focused for a given distance. Moving away from that optimal focus point, the acquired samples will begin to get blurry which is generally unacceptable. Additionally, the sampling density of pixels on the subject varies with distance due to the expanding nature of the imaging frustum. This assumes the user is still able to align in X and Y as the size of the frustum in space shrinks proximal to the sensor. In the case of an iris biometric capture device, infrared illuminators may be used to provide an appropriate light level over the intended capture volume. When the subject is positioned outside the intended capture volume, the light level may be too intense or too weak to acquire an acceptable biometric sample. Therefore, any system must provide a method for a subject to align in X, Y, and Z to acquire an acceptable biometric sample.

One existing alignment method is to show the subject the output from the capture sensor which is effectively an electronic mirror. A simple on-screen indicator such as a box may be used to show the extents of the X and Y capture volume dimensions. The electronic mirror method provides intuitive and rapid feedback for alignment in the X and Y dimensions, but fails to provide adequate feedback in the Z-dimension since the subject will continue to be visible regardless of their distance. Therefore, additional feedback must be provided to guide the user to an appropriate distance. Another existing alignment method is by using text. Text can be added to the electronic mirror feedback indicating "move closer" or "move away" to help guide the user, but this requires they shift their attention to the text, read it assuming they understand that language, and follow the guidance.

One method used to provide Z-dimension feedback is audio feedback instructing the subject to move closer or further. Using audio is a relatively slow and imprecise feedback method. Words are slow to enunciate and take time for the subject to interpret their meaning before being able to start moving. Simple feedback such as "move closer" does not provide any indication of how far to move forward. Precise feedback such as "move forward 2 inches" is difficult for most subjects to accurately move. Additionally, the subject may have moved some distance while the words were being spoken rendering the late feedback inaccurate. This of course assumes the subject knows the language being spoken, the environment is quiet enough to hear the prompts, the voice prompts are not disturbing others, or the like.

Using sounds instead of spoken words can speed up the feedback loop. An example of this is using faster/slower or higher/lower pitch beeps to indicate relative distance. This method works well for providing distance feedback on one side of a capture volume. This type of technique is used to assist drivers backing up a car to avoid hitting an obstacle; it isn't intended to provide feedback on either side of the obstacle. This method must be modified to provide direction indication as well as distance from the capture volume to provide sufficient information to guide a subject into the capture volume.

Another method used to provide Z-dimension feedback is on-screen visual alignment aids. Visual aids may be biometric alignment aids or distance indicators. An example biometric alignment aid could be a pair of circles where the subject is supposed to align both of their eyes. Due to variations in human anatomy, biometric alignment aids can only provide relatively coarse distance feedback. More accurate positional feedback can be provided with a distance indicator. A range meter can simultaneously show which side of the capture volume the subject is on, relative distance to move, and the size of the volume to get within. This complicates the user experience by requiring the subject to alternate their focus between the electronic mirror images and the distance feedback to achieve alignment in X+Y and Z respectively.

Thus, a need exists for an improved method of providing feedback to users so that they may correctly align themselves in all dimensions quickly and accurately. This and other needs are addressed by the systems and methods of multidimensional alignment aid of the present disclosure.

SUMMARY OF THE DISCLOSURE

In accordance with embodiments of the present disclosure, exemplary Z-dimension user-feedback biometric systems are disclosed for facilitating multidimensional alignment of a subject image having an iris of a subject. As used here, the "Z-dimension" is a reference to the dimension extending from the camera to a capture plane of the subject image that is generally perpendicular thereto.

In some embodiments of the disclosure, a Z-dimension user-feedback biometric system is provided for facilitating multidimensional alignment of a subject image having an iris of a subject. In some embodiments of the system, at least one camera and a processing element, e.g., a processor, are provided.

In some embodiments, the camera(s) capture subject images in the capture volume associated with the camera.

The subject images are positioned along a plurality of Z-dimension positions in the capture volume and can include a close subject image captured at a close subject image Z-position at a front of the capture volume, a far subject image captured at a far subject image Z-position at a back of the capture volume, and at a normal subject image position at a normal subject-image Z-position at a mid-range of the capture volume. In some embodiments, a processing element, e.g., a processor, is provided for creating a close display image associated with the close subject image, a far display image associated with the far subject image, and a normal display image associated with the normal subject image. In some embodiments, the close display image has a first exaggerated quality and the far display image has a second exaggerated quality. As discussed below, an example of these exaggerated qualities can include exaggerated brightness and exaggerated darkness.

It is known in the art to determine whether a subject image is a close subject image, a far subject image, and/or a normal subject image, as a normal subject image is an image suitable for, and/or of a desired quality for, processing subject/intended iris biometrics, while the close subject image and the far subject image are images that are of a less than desired quality for the subject/intended iris biometrics. One skilled in the art will appreciate that the present system is applicable to any iris and/or facial biometrics systems, regardless of how a system defines "normal" for that system.

In some embodiments of the disclosure, the Z-dimension user-feedback biometric system includes a display. The display is for displaying the close display image with the first exaggerated quality, the far display image with the second exaggerated quality, and the normal display image (e.g., unexaggerated and/or nominally exaggerated). In some embodiments of the disclosure, the close display image with the first exaggerated quality, the far display image with the second exaggerated quality, and the normal display image are each output from the Z-dimension user-feedback biometric system for further processing and/or to a display external of the system.

In some embodiments of the Z-dimension user-feedback biometric system, the first and second exaggerated qualities are opposite sides of the spectrum of the same parameter, which is referenced herein as being positively exaggerated and negatively exaggerated. For example, in some embodiments, one of the first exaggerated quality and the second exaggerated quality includes exaggerated brightness and the other one of the first exaggerated quality and the second exaggerated quality includes exaggerated darkness. However, other example qualities for exaggeration are contemplated. For example, in some embodiments of the disclosure, one of the first exaggerated quality and the second exaggerated quality includes exaggerated nearness to the camera and the other one of the first exaggerated quality and the second exaggerated quality includes exaggerated farness from the camera. Other examples include positively and negatively exaggerated color saturation, positively and negatively exaggerated hue, positively and negatively exaggerated tint, positively and negatively exaggerated contrast, positively and negatively exaggerated focus, positively and negatively exaggerated image size, and positively and negatively exaggerated false colorization, In some embodiments of the disclosure, the processing element determines whether each of the subject images are a close subject image, a far subject image, or a normal subject image by using a range finder, a depth sensor, a bream break, and/or a pressure sensitive floor pad.

In some embodiments of the disclosure, the processing element determines whether each of the subject images are a close subject image, a far subject image, or a normal subject image by evaluating pixel size and/or an iris-to-iris distance quantity. In some embodiments, the iris-to-iris distance quantity is a value representative of a distance between a first iris of a face and a second iris of the face.

In some embodiments, the iris-to-iris distance quantity might be a value, such as a 62.5 millimeters, for example. In some embodiments, the iris-to-iris distance quantity might be a value range, such as 56.25 to 68.75 millimeters, for example (e.g., plus or minus 10% of a desired value). In some embodiments, the processing element determines whether each of the subject images are a close subject image, a far subject image, or a normal subject image by comparing the pixel sample to the iris-to-iris distance. For example, by knowing the focal length of the camera and the eye-to-eye value, the processing element can evaluate the number of pixels in the subject image that span from iris to iris to compare those pixels against the expected number of pixels to identify if subject image is normal, far, or close.

In some embodiments of the present disclosure, the Z-dimension user-feedback biometric system includes a plurality of cameras. In some embodiments, this includes a color camera and a near infrared (NIR) camera. Accordingly, in some embodiments of the present disclosure, in determining whether the subject images are a close subject image, a far subject image, and a normal subject image, the processing element can evaluate the parallax between two cameras.

In some embodiments, a method of Z-dimension user-feedback is provided for a biometric system to facilitate multidimensional alignment of a subject image having an iris of a subject. In some embodiments, the method includes capturing subject images positioned along a plurality of Z-dimension positions in a capture volume. In some embodiments, the subject images include a close subject image captured at a close subject image Z-position at a front of a capture volume, a far subject image captured at a far subject image Z-position at a back of the capture volume and a subject image at a normal subject image position at a normal subject-image Z-position at a mid-range of the capture volume. In some embodiments, the method includes creating a close display image associated with the close subject image, a far display image associated with the far subject image, and a normal display image associated with the normal subject image. In some embodiments, the close display image has a first exaggerated quality (e.g., a positively exaggerated quality, such as exaggerated brightness, for example) and the far display image has a second exaggerated quality (e.g., a negatively exaggerated quality, such as exaggerated darkness, for example). In some embodiments, the method includes displaying the close display image with the first exaggerated quality, the far display image with the second exaggerated quality, and the normal display image. In some embodiments, the method includes outputting (for further processing and/or or further display on an external display) the close display image with the first exaggerated quality, the far display image with the second exaggerated quality, and the normal display image.

In some embodiments of the present disclosure, a non-transitory computer-readable medium storing instructions can be provided for a Z-dimension user-feedback biometric system to facilitate multidimensional alignment of a subject image having an iris of a subject, where the instructions are executable by a processing device, and wherein execution of the instructions by the processing device causes the processing device to undertake the methods and/or functional features taught herein, including the following for example. In some embodiments, the instructions are to receive information representative of subject images positioned along a plurality of Z-dimension positions in a capture volume including a close subject image captured at a close subject image Z-position at a front of the capture volume, a far subject image captured at a far subject image Z-position at a back of the capture volume, and a normal subject image captured at a normal subject-image Z-position at a mid-range of the capture volume. In some embodiments, the instructions are further executable to create a close display image associated with the close subject image, a far display image associated with the far subject image, and a normal display image associated with the normal subject image, where the close display image has a first exaggerated quality and the far display image has a second exaggerated quality. In some embodiments, the instructions are further executable to display (or output for further processing and/or external display) the close display image with the first exaggerated quality, the far display image with the second exaggerated quality, and the normal display image.

In some embodiments, the Z-dimension user-feedback biometric system processes far or near images (and normal images). For example, some embodiments capture normal subject images and close subject images (to process normal display images and close display images with attendant exaggeration) or capture normal subject images and far subject images (to process normal display images and far display images with attendant exaggeration). However, such systems may be configured and/or capable to process all three types of images (far, close, and normal) though, in operation, they process two types of images (normal and far, or normal and close).

In some embodiments, a Z-dimension user-feedback biometric system is provided for facilitating multidimensional alignment of a subject image having an iris of a subject, where there is at least one camera for capturing subject images positioned along a plurality of Z-dimension positions in a capture volume, and where at least two types of images are processed (normal and far, or normal and close). The subject images include a normal subject image captured at a normal subject image Z-position at a mid-range of the capture volume. In some embodiments, the subject images include at least one of the following: (a) a close subject image captured at a close subject image Z-position at a front of the capture volume; and (b) a far subject image captured at a far subject image Z-position at a back of the capture volume. A processing element creates a normal display image associated with the normal subject image. In some embodiments, where the subject images included the close subject image, the processing element creates a close display image that is associated with the close subject image and that has a first exaggerated quality. In some embodiments (the same or different embodiment), where the subject images included the far subject image, the processing element creates a far display image that is associated with the far subject image and that has a second exaggerated quality. In some embodiments, the subject images of the Z-dimension user-feedback biometric system include both the close subject image and the far subject image. In some embodiments, the display displays a close display image (if there is a close subject image), a far display image (if there is a far subject image), and a normal subject image.

DESCRIPTION OF THE DRAWINGS

For a more complete understanding of the present disclosure, reference is made to the following detailed description of an exemplary embodiment considered in conjunction with the accompanying drawings, in which.

DETAILED DESCRIPTION OF EXEMPLARY EMBODIMENTS

Figure 1:
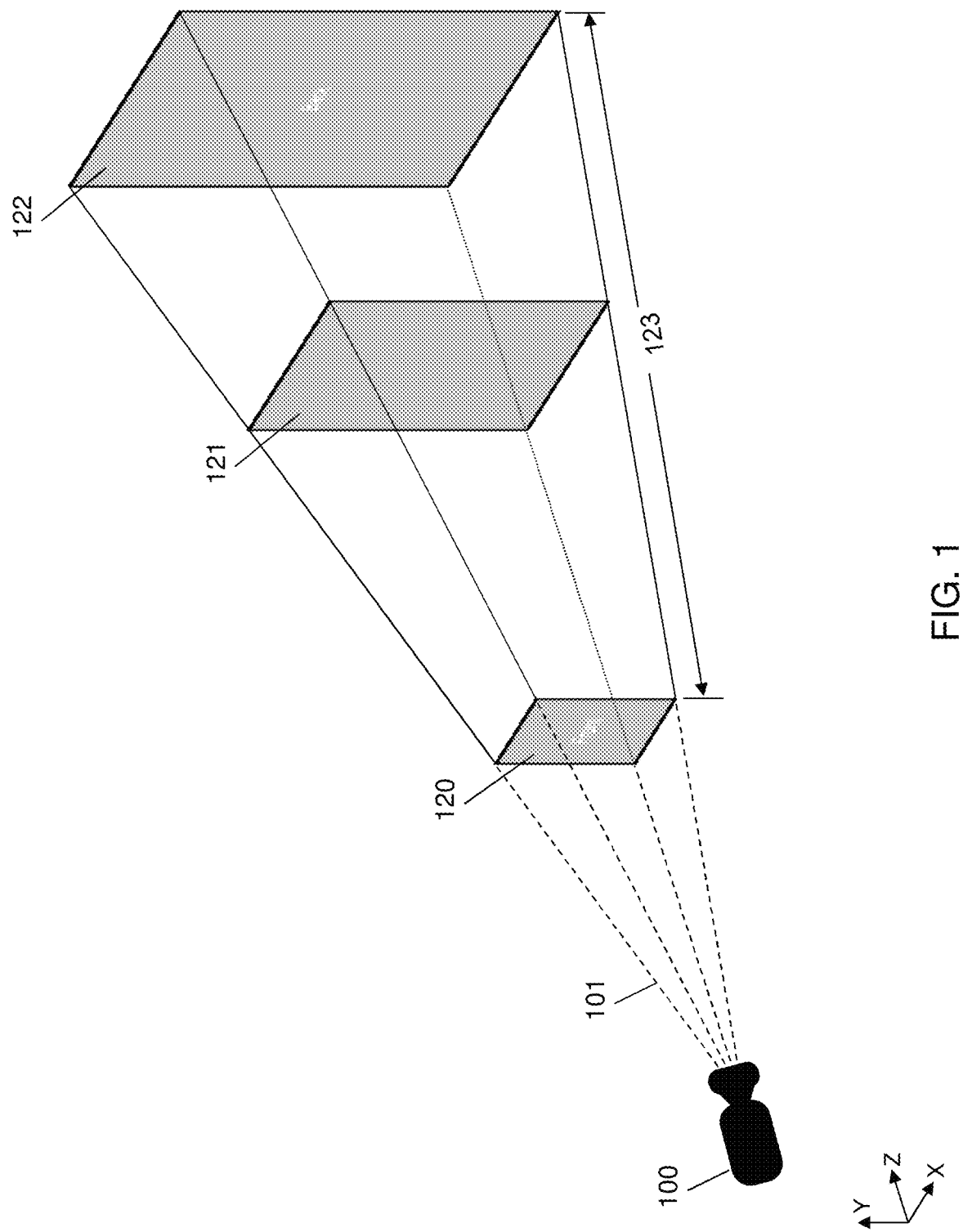
FIG. 1 is a schematic multi-state drawing showing a subject image at three example subject image Z-positions, including a close subject image at the close subject image Z-position at a front of a subject image Z-capture volume, a normal subject image at the normal subject-image Z-position at a mid-range of the subject image Z-capture volume, and a far subject image at a far subject image Z-position at a back of the subject image Z-capture volume.

In some embodiments of the present disclosure, a system includes one or more cameras, one or more display processing elements, and one or more display elements. In some embodiments, to supplement to, and/or as an alternative to, the display elements, transmission means, such as an output device, can be provided for outputting information to an external display and/or to an external processing element for further processing.

In some embodiments, an iris biometric capture device may use an iris camera to acquire iris images. The processing element can use the correctly illuminated, focused, iris image for its biometric analysis purpose. The processing element may also analyze these images to determine a range estimate to the interacting subject. This may be obtained by, for example, making a measurement of the subject's iris diameter, inter-pupil distance, face width, or similar biometric measurements. In some embodiments, the processing element may look at other aspects of the imagery including its focus or sharpness, overall illumination level, key areas of saturation, or similar measurements. In some embodiments, the processing element can modify the image based on the range estimate before forwarding it to the display as feedback for the subject. Modifications may include exaggerating the illumination level making the images brighter or darker when the subject is too close or too far respectively. Another option is to exaggerate the image size making the subject appear excessively close or excessively far when their actual range is incorrect. These modified images provide simultaneous X, Y, and Z dimension feedback. This approach does not require the subject to change their attention focus between two areas for X/Y and Z alignment with low latency in the control loop (every frame is updated with the latest X/Y/Z positional information). The terms "close" and "far" are relative terms referencing respectively whether the subject image is closer (lesser distance) to the camera along the Z-dimension (relative to a normal subject image) and whether the subject image is farther (greater distance) to the camera along the Z-dimension (relative to a normal subject image). The normal position(s) of the subject in the Z-dimension are between the close and far positions along the Z-dimension.

In some embodiments, the system may include multiple cameras such as a color camera and a NIR iris camera. Providing a color image for X/Y feedback may be preferable, such as for users more familiar with color imagery than NIR imagery and therefore. Using multiple cameras (e.g., NIR and color), the system may have additional methods that can be used to estimate range. For example, the parallax between the two cameras can be used to estimate range to the subject through video processing. Using a color camera for feedback allows for additional modifications that can be made to the feedback image. For example, the color saturation, hue, tint, or other properties may be modified in addition to the brightness, contrast, focus, image size, false colorization, and similar modifications associated with grayscale images.

In some embodiments, sensors may be added to the system to provide more accurate or alternate range estimates. This may include range finders, depth sensors, beam breaks, pressure sensitive floor pads, or similar devices in addition to other video processing methods, biometric measurements, etc.

In some embodiments, the system may include a capture volume that differs from the system's instantaneous capture volume. An example of a system with a capture volume that is not equal to the system's instantaneous capture volume is one that has a tilting mechanism that steers an iris camera. The instantaneous capture volume is whatever the camera can see on a given frame. This is also known as the field of view (FoV) or area of regard (AoR). The full capture volume is union of every possible instantaneous capture volume throughout the tilt range. Such systems may have an ability to move in all six degrees of freedom. Examples include focus sweeps, zoom lens, translating platforms, tilting mechanisms, rotating camera heads, and similar motions. The typical goal of these systems is to locate the subject over a broader area in hopes that adequate samples can be acquired without making the subject move. However, when the motions are completed the subject may still be outside the full capture volume and feedback may be necessary. The method described above can be used in conjunction with these types of systems.

Figure 2:
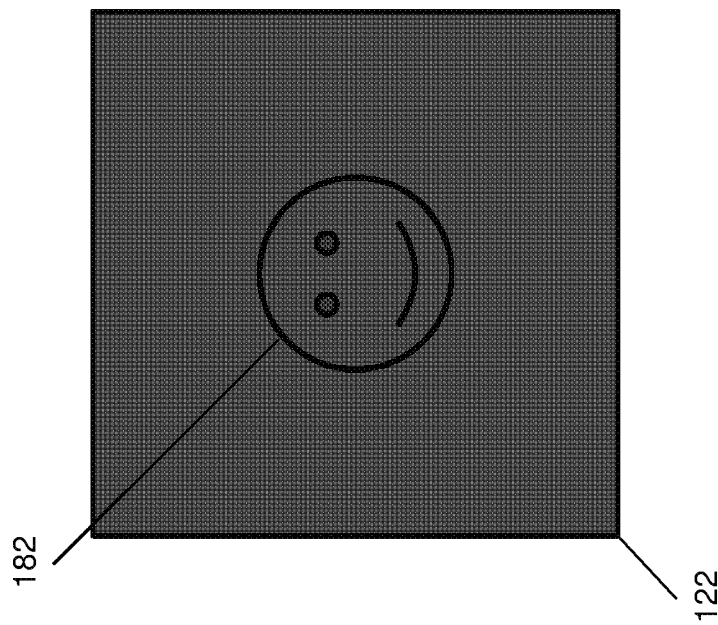
FIG. 2 is a schematic drawing showing three example display images corresponding to the three example subject images of FIG. 1, including a close display image showing the close subject image with exaggerated brightness, the normal subject image with normal exposure, and the far subject image with exaggerated darkness.
Figure 2:
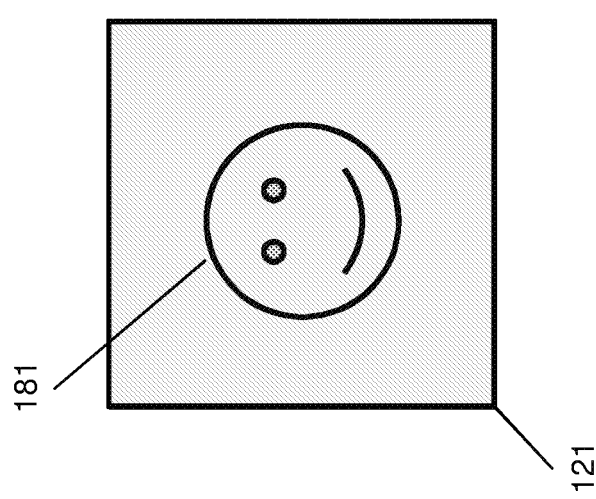
Figure 2:
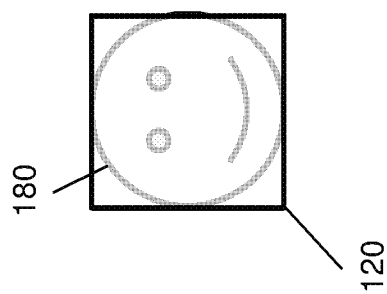
Figure 3:
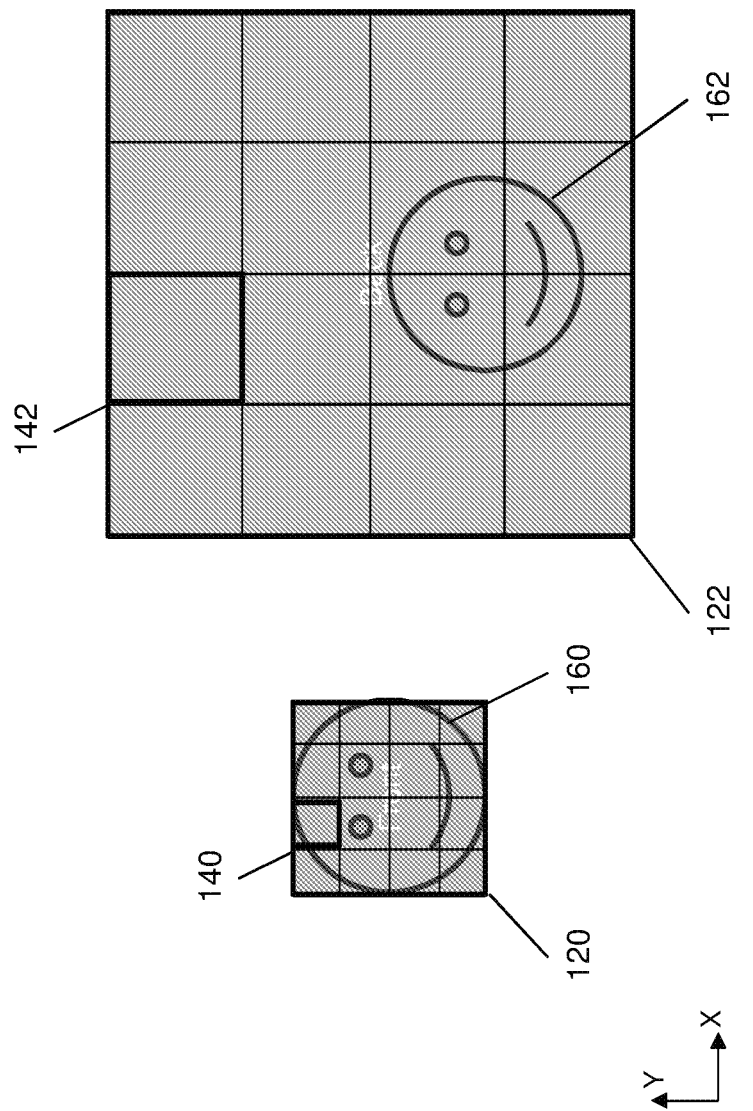
FIG. 3 is a schematic drawing showing two example feedback pixel samples, including a close feedback pixel sample associated with the close display image of FIG. 2, and a far feedback pixel sample associated with the far subject image of FIG. 2.

With reference to FIGS. 1-3, discussion shall be had with respect to some example embodiments. FIG. 1 shows at least one camera 100 associated with a capture volume 123 extending from a location near the camera 100 and a location far from the camera 100 along the Z-dimension, where the capture volume can be defined by a plurality of frustum lines 101 extending from the camera 100. It shall be understood by those skilled in the art that the at least one camera 100, referenced herein in the shorthand as camera 100, can comprise a plurality of cameras 100. The capture volume 123 is associated with an infinite number of capture image planes therein at which subject images can be positioned and captured, depending on the position of the subject (e.g., a human) within the capture volume 123. For example, as the camera and the subject dynamically move closer and farther away from one another, subject images might be taken at a position on the Z-dimension that is normal relative to that which is desired (e.g., the normal subject image 121), that is too close relative to that which is desired (e.g., the close subject image 120), and that is too far relative to that which is desired (e.g., the far subject image 122). Defining the thresholds for that which is normal, too close (referenced herein as "close), and too far (referenced herein as "far"), is a function of the focal length of the camera and the image processing characteristics thereof, and are known in the art.

Referring to FIG. 2, a visual display to the user can include exaggerated qualities to inform the user of whether the subject image is in a desired (normal) range along the Z-dimension for proper alignment with an iris and/or facial biometrics system. For example, FIG. 2, shows a close display image 180 associated with the close subject image 120, such that the close display image 180 is shown with an exaggerated first quality (e.g., exaggerated brightness) and, and a far display image 182 associated with the far subject image 122, such that the far display image 182 is shown with an exaggerated second quality (e.g., exaggerated darkness). These are examples of positively and negatively exaggerated qualities, and other examples of positively and negatively exaggerated qualities are contemplated, such as exaggerated low contrast and exaggerated high contrast, for example. FIG. 2 also shows a normal display image 181 associated with the normal subject image 121, which, in preferred embodiments, shows an unexaggerated and/or nominally exaggerated rendering of the quality.

Thus, in an iris biometrics system, where a user of the camera points the camera at the subject (e.g., a person whose image is being taken) to capture a subject image thereof, the user can move the camera in an effort to align the subject image in the capture volume along the X, Y, and Z dimensions. To inform the user of the camera whether the subject is too far or too close for the purpose of facilitating the iris biometrics system, the display image that is seen by the user will be altered, such that, if the subject is too close, the display image will have one type of exaggeration (e.g., the exaggerated brightness of close display image 180) or another type of exaggeration (e.g., the exaggerated darkness of far display image 182). In this regard, a user of the camera can easily identify the proper positioning of the subject along the Z-dimension without being required to inconveniently avert the camera user's eyes to a meter or other indicia, for example. The system is dynamic, and, as the subject moves closer to the camera 100, the level of close exaggeration (e.g., brightness) increases, and, as the subject moves farther from the camera 100, the level of far exaggeration (e.g., darkness) increases, thereby enabling the camera user to move closer/farther to the subject (or having the subject move closer/farther to the camera) until the camera user identifies that the display image is a normal display image that is unexaggerated and/or nominally exaggerated, e.g., sufficient for the purposes of alignment along the Z-dimension for the iris (and/or facial) biometrics system with which the present disclosure may be provided.

Systems and methods for determining the range of the subject image to the camera 100 are known in the art (as are systems and methods for determining what is the normal (desired) operating point), and any such system and/or method suitable for the present disclosure can be employed. However, referring to FIG. 3, further discussion of an example thereof shall be further discussed. FIG. 3 shows an example of the close subject image 120, which can be represented as an X-Y plane taken from the capture volume 123, and the far subject image 122, which can be represented as an X-Y plane taken from the capture volume. The camera 100 takes images having a certain pixel size. An example pixel sample 140 is shown from the close subject image 120 and an example pixel sample 142 is shown from the far subject image 122. In the example, both samples are from an image evenly divided into four equal columns and four equal rows of a square image, in which the sample was taken from row one, column two. It is expected that the number of pixels in subject image 140 is the same as (equal to) the number of pixels in example pixel sample 142. However, it can be seen that, in close subject image 120, the example pixel sample 140 is larger in relation to the subject image face 160, whereas, in the far subject image 122, the example pixel sample 142 is smaller in relation to the subject image face. Conventional iris biometric systems use a predetermined amount (e.g., quantity or quantity range) for the iris-to-iris distance, which is typically representative of an average across a sample of human beings, for example. Conventional iris biometric systems can measure an apparent iris-to-iris distance of the subject in the subject image. By knowing the apparent iris-to-iris distance of the subject from the subject image, the predetermined amount for iris-to-iris distance (e.g., quantity or ranges thereof), and the focal length of the camera 100, for example, the relationship between the pixel sample 140 and the subject image 120 (and/or the relationship between the pixel sample 142 and the subject image 122, for example), the system can identify if the subject image 120 is too close (and/or whether the subject image 122 is too far). Further, the particular iris biometrics system also can define a normal (amount and/or quantity) and normal subject image based on the desired Z-dimension amount (quantity or range thereof) for said iris biometrics systems, and such is dependent upon factors known in the art, such as focal length, for example. As discussed above, FIG. 3 is an example of how range can be determined, however, any suitable systems and method known in the car can be used for determining if a subject image is too close, too far, normal, and/or a position on the spectrum relative thereto, for dynamic exaggeration of the image along a spectrum (e.g., increasing brightness and/or increasing darkness).

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

What is claimed is:

1. A Z-dimension user-feedback biometric system for facilitating multidimensional alignment of an image having an iris of a subject, the system comprising:
   a camera for capturing at least one image of a subject positioned along a plurality of Z-dimension positions in a capture volume of the camera, the Z-dimension positions in the capture volume including a close subject image Z-position at a front of the capture volume, a far subject image Z-position at a back of the capture volume, and a normal subject image Z-position at a mid-range of the capture volume, the mid-range of the capture volume being between the front and the back of the capture volume;
   a display for providing a display image of the subject in the capture volume prior to capturing the at least one image of the subject with the camera; and
   a processing element for altering the display image of the subject in the display by increasing or decreasing a level of an exaggerated quality in the display image as the Z-dimension position of the subject in the capture volume changes from the normal subject image Z-position towards the close subject image Z-position or the far subject image Z-position respectively.

2. The Z-dimension user-feedback biometric system of claim 1, wherein the processing element dynamically alters the display image with the increased or decreased level of the exaggerated quality in the display image as the Z-dimension position of the subject in the capture volume changes from the normal subject image Z-position towards the close subject image Z-position or the far subject image Z-position respectively.

3. The Z-dimension user-feedback biometric system of claim 1, wherein the display displays the altered display image with the exaggerated quality as the Z-dimension position of the subject in the capture volume changes from the normal subject image Z-position towards the close subject image Z-position or the far subject image Z-position.

4. The Z-dimension user-feedback biometric system of claim 1, wherein the display displays the display image with an unexaggerated quality or a nominal exaggerated quality when the subject is in the normal subject image Z-position.

5. The Z-dimension user-feedback biometric system of claim 1, wherein the processing element alters the display image by gradually increasing the level of the exaggerated quality in the display image as the Z-dimension position of the subject in the capture volume changes from the normal subject image Z-position towards the close subject image Z-position.

6. The Z-dimension user-feedback biometric system of claim 1, wherein the processing element alters the display image by gradually decreasing the level of the exaggerated quality in the display image as the Z-dimension position of the subject in the capture volume changes from the normal subject image Z-position towards the far subject image Z-position.

7. The Z-dimension user-feedback biometric system of claim 1, wherein the processing element alters a rendering of the display image in the display by increasing or decreasing the level of the exaggerated quality in the display image.

8. The Z-dimension user-feedback biometric system of claim 1, wherein the increase in the level of the exaggerated quality includes an exaggerated brightness of the display image and the decrease in the level of the exaggerated quality includes an exaggerated darkness of the display image.

9. The Z-dimension user-feedback biometric system of claim 1, wherein the increase in the level of the exaggerated quality includes an exaggerated nearness to the camera of the subject displayed in the display image and the decrease in the level of the exaggerated quality includes an exaggerated farness from the camera of the subject displayed in the display image.

10. The Z-dimension user-feedback biometric system of claim 1, wherein increasing or decreasing the level of the exaggerated quality includes an increase or decrease in the level of at least one of color saturation, exaggerated hue, tint, contrast, focus, image size, and false colorization, as displayed in the display image.

11. The Z-dimension user-feedback biometric system of claim 1, wherein the processing element uses at least one of a range finder, a depth sensor, a bream break, and a pressure sensitive floor pad to determine the Z-dimension position of the subject in the capture volume.

12. The Z-dimension user-feedback biometric system of claim 1, wherein the processing element evaluates at least one of pixel size and an iris-to-iris distance quantity to determine the Z-dimension position of the subject in the capture volume.

13. The Z-dimension user-feedback biometric system of claim 12, wherein the iris-to-iris distance quantity is a value representative of a distance between a first iris of a face and a second iris of the face.

14. The Z-dimension user-feedback biometric system of claim 1, wherein the at least one camera includes a plurality of cameras, and wherein the processing element determines whether the display image is a normal display image associated with the normal subject image Z-position, a close subject image associated with the close subject image Z-position, or a far subject image associated with the far subject image Z-position by evaluating a parallax between the plurality of cameras.

15. A method of providing Z-dimension user-feedback for a biometric system to facilitate multidimensional alignment of an image having an iris of a subject, the method comprising:

capturing with a camera at least one image of a subject positioned along a plurality of Z-dimension positions in a capture volume of the camera, the Z-dimension positions in the capture volume including a close subject image Z-position at a front of the capture volume, a far subject image Z-position at a back of the capture volume, and a normal subject image Z-position at a mid-range of the capture volume, the mid-range of the capture volume being between the front and back of the capture volume;

providing a display image of the subject in the capture volume at a display prior to capturing the at least one image of the subject with the camera; and altering the display image of the subject in the display with a processing element by increasing or decreasing a level of an exaggerated quality in the display image as the Z-dimension position of the subject in the capture volume changes from the normal subject image Z-position towards the close subject image Z-position or the far subject image Z-position respectively.

16. The method of claim 15, wherein the processing element dynamically alters the display image with the increased or decreased level of the exaggerated quality in the display image as the Z-dimension position of the subject in the capture volume changes from the normal subject image Z-position towards the close subject image Z-position or the far subject image Z-position respectively.

17. The method of claim 15, wherein the display displays the altered display image with the exaggerated quality as the Z-dimension position of the subject in the capture volume changes from the normal subject image Z-position towards the close subject image Z-position or the far subject image Z-position.

18. The method of claim 15, wherein the processing element alters the display image by gradually increasing the level of the exaggerated quality in the display image as the Z-dimension position of the subject in the capture volume changes from the normal subject image Z-position towards the close subject image Z-position.

19. A non-transitory computer-readable medium storing instructions for a Z-dimension user-feedback biometric system for facilitating multidimensional alignment of an image having an iris of a subject, the instructions being executable by a processing device, wherein execution of the instructions by the processing device causes the processing device to:

capture with a camera at least one image of a subject positioned along a plurality of Z-dimension positions in a capture volume of the camera, the Z-dimension positions in the capture volume including a close subject image Z-position at a front of the capture volume, a far subject image Z-position at a back of the capture volume, and a normal subject image Z-position at a mid-range of the capture volume, the mid-range of the capture volume being between the front and back of the capture volume;

provide a display image of the subject in the capture volume at a display prior to capturing the at least one image of the subject with the camera; and alter the display image of the subject in the display with a processing element by increasing or decreasing a level of an exaggerated quality in the display image as the Z-dimension position of the subject in the capture volume changes from the normal subject image Z-position towards the close subject image Z-position or the far subject image Z-position respectively.

20. The non-transitory computer-readable medium of claim 19, wherein increasing or decreasing the level of the exaggerated quality includes an increase or decrease in the level of at least one of brightness/darkness, nearness/farness, color saturation, hue, tint, contrast, focus, image size, and false colorization, as displayed in the display image.

* * * * *